(12) United States Patent
Brown

(10) Patent No.: US 7,540,815 B2
(45) Date of Patent: Jun. 2, 2009

(54) IN-SERIES TWO CHAIN CONTINUOUSLY VARIABLE TRANSMISSION

(76) Inventor: Albert W. Brown, 1207 Pembroke La., Newport Beach, CA (US) 92660

( * ) Notice: Subject to any disclaimer, the term of this patent is extended or adjusted under 35 U.S.C. 154(b) by 744 days.

(21) Appl. No.: 11/032,924

(22) Filed: Jan. 11, 2005

(65) Prior Publication Data

US 2006/0154760 A1  Jul. 13, 2006

(51) Int. Cl.
*F16H 9/12* (2006.01)
*F16H 55/56* (2006.01)

(52) U.S. Cl. .............................. 474/27; 474/8; 474/144; 474/199; 474/43

(58) Field of Classification Search ................... 474/27, 474/8, 144, 199, 43
See application file for complete search history.

(56) References Cited

U.S. PATENT DOCUMENTS

| | | | |
|---|---|---|---|
| 917,684 A | 4/1909 | Van Nort | |
| 1,492,793 A * | 5/1924 | Hansen | 384/474 |
| 1,676,894 A * | 7/1928 | Frank | 384/474 |
| 1,727,232 A | 9/1929 | Farrell | |
| 1,819,227 A | 8/1931 | Chorlton | |
| 2,158,047 A | 5/1939 | Weston | |
| 2,183,267 A | 12/1939 | Rieser | |
| 2,218,712 A | 10/1940 | Johnson | |
| 2,221,166 A | 11/1940 | Heinrich et al. | |
| 2,256,114 A | 9/1941 | Heyer | |
| 2,258,970 A | 10/1941 | Buettell | |
| 2,293,638 A | 8/1942 | Clarkson | |
| 2,410,915 A | 11/1946 | Willmott | |
| 2,522,353 A | 9/1950 | Eserkaln | |
| 2,648,987 A | 8/1953 | Curtis | |
| 2,770,978 A | 11/1956 | Troemel | |
| 2,831,358 A | 4/1958 | Michie | |
| 2,927,470 A | 3/1960 | Heyer | |
| 3,280,649 A | 10/1966 | Bruet | |
| 3,380,315 A | 4/1968 | Emerson | |
| 3,638,744 A | 2/1972 | Washizawa | |

(Continued)

FOREIGN PATENT DOCUMENTS

DE  906395  3/1954

(Continued)

OTHER PUBLICATIONS

CIVIC 1996 CVT Service Manual Supplement; Honda Motor Co., Ltd. pp. 14-2 through 14-31.

(Continued)

*Primary Examiner*—Robert A Siconolfi
*Assistant Examiner*—Mahbubur Rashid
(74) *Attorney, Agent, or Firm*—Knobbe, Martens, Olson & Bear, LLP

(57) ABSTRACT

A continuously variable transmission has an input pulley assembly connected to a first transfer pulley assembly with a first chain and a second transfer pulley assembly connected to an output pulley assembly with a second chain. The first transfer pulley assembly and the second transfer pulley assembly shaft a common shuttle disk that moves axially on a countershaft that carries the first and second transfer pulleys. The input pulley assembly and the output pulley assembly are generally axially aligned and a bearing carrier is positioned between the pulleys. A high pressure fluid supply system reduces or eliminates axial loading on the shafts of the transmission.

13 Claims, 6 Drawing Sheets

U.S. PATENT DOCUMENTS

| | | |
|---|---|---|
| 3,672,166 A | 6/1972 | Isaac |
| 3,699,827 A | 10/1972 | Vogel |
| 3,715,928 A | 2/1973 | Case et al. |
| 3,762,231 A | 10/1973 | Pettigrew |
| 3,828,555 A | 8/1974 | Capdevielle |
| 3,903,652 A | 9/1975 | Baughman et al. |
| 4,026,161 A | 5/1977 | Vogel |
| 4,056,987 A | 11/1977 | Hoffmann |
| 4,125,037 A | 11/1978 | Palmer et al. |
| 4,165,795 A | 8/1979 | Lynch et al. |
| 4,194,608 A | 3/1980 | Usui et al. |
| 4,324,156 A | 4/1982 | Iwanaga et al. |
| 4,354,547 A | 10/1982 | Sugiura |
| 4,378,221 A | 3/1983 | Huff et al. |
| 4,449,423 A | 5/1984 | Carriere |
| 4,452,494 A | 6/1984 | Kadota |
| 4,464,144 A | 8/1984 | Kobayashi |
| 4,474,079 A | 10/1984 | Crockett |
| 4,484,901 A | 11/1984 | Toti et al. |
| 4,504,246 A | 3/1985 | Mott |
| 4,539,867 A | 9/1985 | Ishimi |
| 4,548,099 A | 10/1985 | Wayman et al. |
| 4,679,396 A | 7/1987 | Heggie |
| 4,691,592 A | 9/1987 | de Brie Perry |
| 4,705,492 A | 11/1987 | Hattori et al. |
| 4,713,041 A | 12/1987 | Stockton |
| 4,772,247 A | 9/1988 | Stockton |
| 4,857,034 A | 8/1989 | Kouno et al. |
| 4,872,371 A | 10/1989 | Fellows |
| 4,875,893 A | 10/1989 | Giacosa |
| 4,901,597 A | 2/1990 | Hattori et al. |
| 4,947,700 A | 8/1990 | Kern et al. |
| 4,967,621 A | 11/1990 | Soga et al. |
| 4,987,967 A | 1/1991 | Kouno |
| 5,006,092 A | 4/1991 | Neuman et al. |
| 5,006,093 A | 4/1991 | Itoh et al. |
| 5,090,527 A | 2/1992 | Imamura et al. |
| 5,121,936 A | 6/1992 | Cowan |
| 5,167,591 A | 12/1992 | Cowan |
| 5,176,579 A | 1/1993 | Ohsono et al. |
| 5,186,692 A | 2/1993 | Gleasman et al. |
| 5,215,323 A | 6/1993 | Cowan |
| 5,274,736 A | 12/1993 | Rohr |
| 5,314,037 A | 5/1994 | Shaw et al. |
| 5,323,737 A | 6/1994 | Farrell |
| 5,358,450 A | 10/1994 | Robert |
| 5,368,529 A | 11/1994 | Machida |
| 5,468,192 A | 11/1995 | Robbins |
| 5,527,226 A | 6/1996 | Lamers |
| 5,529,138 A | 6/1996 | Shaw et al. |
| 5,562,555 A | 10/1996 | Peterson |
| 5,605,513 A | 2/1997 | Van Der Hardt Aberson |
| 5,607,371 A | 3/1997 | Yamaguchi |
| 5,645,507 A | 7/1997 | Hathaway |
| 5,647,802 A | 7/1997 | Gleasman et al. |
| 5,647,810 A | 7/1997 | Huddleston |
| 5,662,547 A | 9/1997 | Moroto et al. |
| 5,692,983 A | 12/1997 | Bostelmann |
| 6,012,998 A | 1/2000 | Schutz et al. |

FOREIGN PATENT DOCUMENTS

| | | |
|---|---|---|
| DE | 43 05 102 A1 | 8/1994 |
| FR | 1 130 289 | 9/1956 |
| FR | 2 327 456 | 5/1977 |
| GB | 1 434 717 | 5/1976 |
| JP | 1-250650 | 10/1989 |

OTHER PUBLICATIONS

"Belt Drive Transmission Gears Up For The '80s," Automotive Industries, Mar. 1980: pp. 34-38.

Choi et al. Analysis of Belt Behavior for an Automotive V-Belt CVT. pp. 263-269.

Vanvuchelen et al. Electronic Control of Continuously Variable Transmissions. pp. 100-109.

Gerbert, Goran. "Metal-V-Belt Mechanics." The American Society of Mechanical Engineers. pp. 1-9.

Lee et al. Analysis of Primary and Secondary Thrusts for A Metal Belt CVT Part 1: New Formula for Speed Ratio-Torque-Thrust Relationship Considering Band Tension and Block Compression. SAE Technical Paper Series, 2000.

Blumenthal et al. Claas CVT Development for Different Applications in Commercial Vehicles. SAE Technical Paper Series, 2000.

Schönnenbeck et al. The Development of Mechanical Infinitely Variable Chain/Belt Drives. CVT 2002 Congress, Munich, Oct. 7/8, 2002: VDI-Berichte 1709 pp. 1-22.

Bradley et al. Servo-Pump Hydraulic Control System Performance and Evaluation for CVT Pressure and Ratio Control. CVT 2002 Congress, Munich, Oct. 7/8, 2002: VDI-Berichte 1709 pp. 35-41.

Faust et al. Efficiency-Optimised CVT Hydraulic and Clamping System CVT 2002 Congress, Munich, Oct. 7/8, 2002: VDI-Berichte 1709 pp. 43-58.

Englisch et al. 500 Nm CVT-LuK Components in Power Split. CVT 2002 Congress, Munich, Oct. 7/8, 2002: VDI-Berichte 1709 pp. 147-163.

Beccari et al. Experimental Results for a Two-Mode Split-Way CVT. CVT 2002 Congress, Munich, Oct. 7/8, 2002: VDI-Berichte 1709 pp. 165-178.

J. van Rooij et al. Development of a 700 Nm Chain-CVT. CVT 2002 Congress, Munich, Oct. 7/8, 2002: VDI-Berichte 1709 pp. 179-194.

A. F. A. Serrarens et al. Tip Shift in the Zero Inertia Powertrain. CVT 2002 Congress, Munich, Oct. 7/8, 2002: VDI-Berichte 1709 pp. 327-341.

Milner et al. Milner CVT for High Torque Applications. CVT 2002 Congress, Munich, Oct. 7/8, 2002: VDI-Berichte 1709 pp. 543-554.

Stockl, B. Development of a Pressure-Controlled Clamping System for Continuously Variable Belt and Chain Transmissions. CVT 2002 Congress, Munich, Oct. 7/8, 2002: VDI-Berichte 1709 pp. 571-582.

* cited by examiner

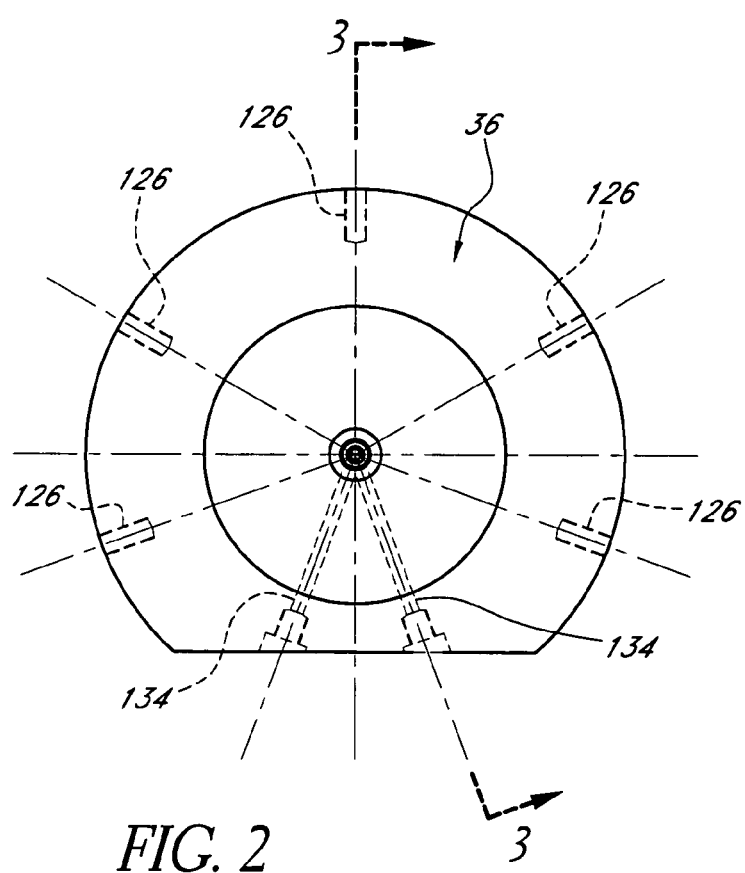
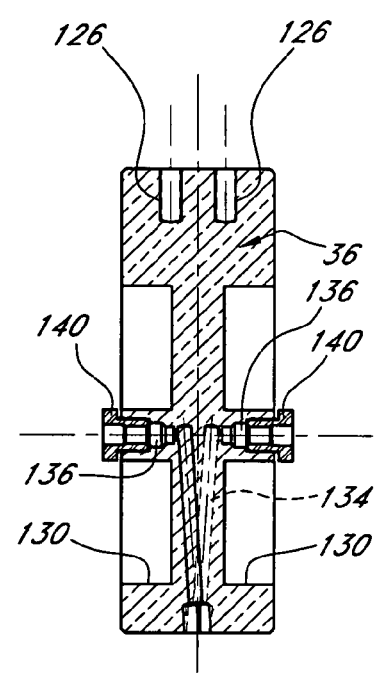
FIG. 2
FIG. 3

IN-SERIES TWO CHAIN CONTINUOUSLY VARIABLE TRANSMISSION

BACKGROUND OF THE INVENTION

1. Field of the Invention

The present invention generally relates to endless belt power transmission systems or components. More particularly, the present invention relates to such systems or components in which there are plural belts in series that are joined via a countershaft.

2. Description of the Related Art

One type of continuously variable transmission (CVT) uses a belt/chain and pulley configuration. Such transmissions vary the input to output shaft ratio by changing the effective diameter of the pulleys. In effect, the output speed can be varied even while the input speed remains constant. Thus, the CVT allows the engine to operate in a fuel economy sweet spot even while the associated vehicle accelerates and decelerates along the freeway.

SUMMARY OF THE INVENTION

While CVT vehicles offer an upside of improved fuel economy, several perceived drawbacks have greatly limited the number of vehicles featuring such transmissions. In particular, belt/chain drives have found limited application in larger passenger vehicles and medium size trucks. These types of vehicles commonly require drive ratios that make single belt CVT technology not feasible. For instance, larger vehicles require a large high to low ratio spread in order to begin moving at one end of the ratio spread while maintaining adequate on-road speeds at the other end of the ratio spread. While large ranges can be created with large pulleys, such an approach increases the size and weight of the CVT.

Thus, one aspect of the present invention involves providing a continuously variable transmission in which two belts are arranged in series. By arranging the belts in series, a larger ratio spread can be employed while using smaller diameter pulleys. In addition, the input and output shafts can be coaxially positioned.

Another difficulty that is associated with prior continuously variable transmission designs in general is the large number of parts and the complicated assembly resulting from the large number of parts. Both the number of parts and the specialized nature of the parts drive up the manufacturing cost of the transmissions. Moreover, the complicated assembly increases required assembly man hours, which further increases the cost of the transmissions. Thus, another aspect of the present invention provides a simplified construction for the transmission by integrating components and duplicating other components.

A further aspect of the present invention involves a continuously variable transmission comprising a two-piece housing that defines a belt chamber. An input pulley assembly and an output pulley assembly are positioned within the belt chamber. A first transfer pulley assembly and a second transfer pulley assembly are mounted to a countershaft. A first chain extends between the input pulley assembly and the first transfer pulley assembly. A second chain extends between the second transfer pulley assembly and the output pulley assembly. The input pulley assembly comprises a first end and a second end. The first end is supported by the housing and the second end is supported by a bearing holder. The output pulley assembly comprises a first end and a second end. The first end is supported by the housing and the second end is supported by the bearing holder. The countershaft comprises a first end and a second end. The first end is supported by the housing and the second end is supported by the housing. The input pulley assembly comprises a shaft portion and a fixed disk portion. The shaft portion and the disk portion are integrally formed. The input pulley assembly also comprises a bulkhead that is axially fixed along the shaft portion and a moveable disk that is positioned between the bulkhead and the fixed disk portion. The bulkhead is secured to the shaft portion against substantial rotation relative to the shaft portion and the moveable disk portion is coupled to the bulkhead for rotation while remaining axially movable along the shaft portion relative to the bulkhead. The output pulley assembly comprises a shaft portion and a fixed disk portion. The shaft portion and the disk portion are integrally formed. The output pulley assembly also comprises a bulkhead that is axially fixed along the shaft portion and a moveable disk that is positioned between the bulkhead and the fixed disk portion. The bulkhead is secured to the shaft portion against substantial rotation relating to the shaft portion and the moveable disk portion is coupled to the bulkhead against substantial rotation while remaining axially movable along the shaft portion relative to the bulkhead. The first transfer pulley assembly comprises a fixed disk portion and a moveable disk portion. The fixed disk portion is axially and rotationally secured to the countershaft. The second transfer pulley assembly comprises a fixed disk portion and a moveable disk portion. The fixed disk portion is axially and rotationally secured to the countershaft. The moveable disk portion of the first transfer pulley assembly and the moveable disk portion of the second transfer pulley assembly are defined in a single shuttle disk member. The shuttle disk member is positioned along the countershaft between the fixed disk portion of the first transfer pulley assembly and the fixed disk portion of the second transfer pulley assembly. The shuttle disk member is adapted for axial translation along the countershaft. The shuttle disk member comprises a first bearing portion and a second bearing portion that are separated by a recessed portion. The first and second bearing portions abut the countershaft. The shuttle disc member moves back and forth along the shaft in response to the changes in the effective radii experienced by the belts and dictated by movement of the input and output shaft moveable disc portions.

BRIEF DESCRIPTION OF THE DRAWINGS

These and other features, aspects and advantages of the present invention will now be described with reference to the drawings of a preferred embodiment, which embodiment is intended to illustrate and not to limit the invention. The drawings comprise seven figures.

FIG. 2 is a side view of a bearing holder employed in the transmission of FIG. 1.

FIG. 3 is a sectioned view of the bearing holder taken along the line 3-3 in FIG. 2.

DETAILED DESCRIPTION OF THE PREFERRED EMBODIMENT

Figure 1:
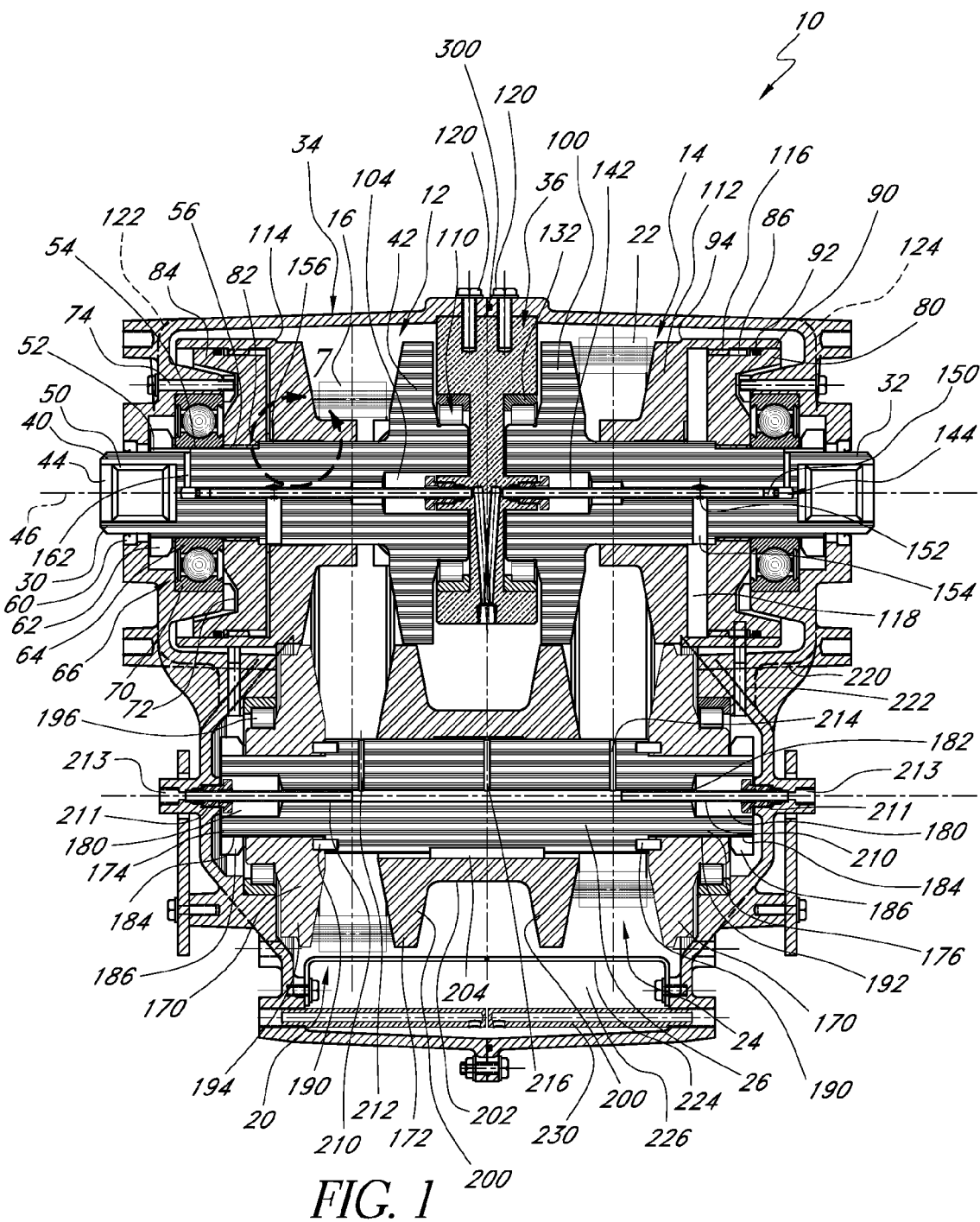
FIG. 1 is a sectioned view of a transmission that is arranged and configured in accordance with certain features, aspects and advantages of the present invention.

FIG. 1 illustrates an embodiment of a transmission 10 that is arranged and configured in accordance with certain features, aspects and advantages of the present invention. While shown in the context of a dual belt transmission, some of the features, aspects and advantages can be used in single belt transmission, such as that shown in copending U.S. patent application Ser. No. 11/033,206, filed on the same date as this application, entitled SINGLE CHAIN CONTINUOUSLY VARIABLE TRANSMISSION, and which is hereby incorporated by reference in its entirety.

The illustrated transmission 10 generally comprises an input pulley assembly 12 and an output pulley assembly 14. A first chain 16 connects the input pulley assembly 12 to a first transfer pulley assembly 20 and a second chain 22 connects a second transfer pulley assembly 24 to the output pulley assembly 14. The two transfer pulley assemblies 20, 24 are mounted on a common countershaft 26.

Thus, the illustrated transmission 10 comprises a pair of chains 16, 22 that are mounted in series where power is transferred from an input shaft 30 to an output shaft 32 via the countershaft 26. As used herein, the term "chain" means belt, chain or other suitable forms of endless loops that can be used to transfer power from one pulley to another pulley. "Chain" also means a series of usually metal links or rings connected to or fitted into one another and used for transmission of mechanical power. One advantage to positioning the chains 16, 22 in series is that the overall ratio change in the transmission 10 can be multiplied to a desirable value while maintaining relatively smaller pulley diameters and relatively smaller axial movement of the pulley when compared to a single chain transmission. While the illustrated embodiment features input and output shafts that are generally axially aligned, other configurations are possible. The axially aligned or concentric shafts, however, provide a more compact and easy to install assembly.

A portion of an outer housing 34 and a bearing holder 36 support the input shaft 30. The input shaft 30 and the output shaft 32, together with the components both supporting the respective shafts and supported by the respective shafts, are substantially identical in the illustrated arrangement. As such a description of either shaft in the illustrated embodiment can apply to the other shaft. For simplicity of description, the description of the illustrated input shaft 30 and its related components can equally apply to the output shaft 32 and its related components. Thus, reference numerals throughout the following description have been placed on either of the two shafts 30, 32 and the related components to reduce the number of elements being identified on a single shaft.

The input shaft 30 comprises a first end 40 and a second end 42. The first end 40 comprises a bore 44 that extends inward along a rotational axis 46 of the input shaft 30. The bore 44 can have any suitable configuration. In the illustrated arrangement, the bore 44 comprises splines 50 that can be used to couple the transmission to any suitable input system. For example, an output shaft from the engine can be coupled to the transmission by the splines 50. Other suitable coupling structures can be used.

Externally, the first end 40 of the input shaft 30 comprises a threaded region 52, a journal region 54 and a spline region 56. The threaded region 52 preferably is positioned somewhat inboard of the extreme end of the first end 40. In other words, between the extreme end and the threaded region 52, a smooth region preferably is provided against which a seal 60 abuts. A lock nut 62 engages the threaded region 52. The illustrated lock nut 62 secures an inner race 64 of a bearing 66 while a retaining ring 72 secures an outer race 70 of the bearing 66 in position. Any suitable arrangement can be used to secure the retaining ring 72 in position. In the illustrated arrangement, bolts 74 secure the ring in position. Thus, in the illustrated arrangement, the retaining ring 72 and the nut 62 capture the bearing 66 in position along the journal region 54 of the input shaft 30 such that the bearing 66 can resist thrust loads in both directions.

A bulkhead 80 comprises internal splines that engage the spline region 56 of the input shaft 30. The bulkhead 80 can be formed by casting, forging or any other suitable technique. In some arrangements, such as the illustrated arrangement, the bulkhead 80 and the input shaft 30 can comprise a locating step 82, which acts to properly position the bulkhead 80 relative to the input shaft 30 during assembly. The spline coupling of the bulkhead 80 to the input shaft 30 rotationally secures the bulkhead 80 and the input shaft 30 with minimal backlash. Thus, the input shaft 30 transfers input torque to the bulkhead 80 through the spline connection.

The illustrated bulkhead 80 also comprises an outer skirt 84. An outer surface of the skirt 84 preferably comprises a spline region 86 and a bearing region 90. In the illustrated arrangement, a small gap is provided between the spline region 86 and the bearing region 90. Moreover, the outer surface of the skirt 84 also comprises a ring groove 92. The ring groove 92 accommodates an o-ring that is positioned to seal or substantially seal a sliding connection between the skirt 84 and a cylinder wall 94. The cylinder wall 94 slides along the skirt 84 during operation of the pulley assembly 12, as will be described in greater detail below.

With continued reference to FIG. 1, the second end 42 of the input shaft 30 comprises a disk portion 100 and a journal portion 102. At its extreme second end, the illustrated input shaft 30 comprises a stepped bore 104. The stepped bore 104 preferably has a larger diameter portion that extends inward through the disk portion 100 of the illustrated shaft 30. A smaller diameter portion then extends a short distance beyond the disk portion 100 toward the first end 40 of the shaft 30.

Adjacent to the extreme second end, the journal portion 102 defines an inner race of a bearing 110. As such, the journal portion preferably replaces an inner race of the bearing 110 and reduces the number of components that must be assembled when building the transmission 10. In some embodiments, however, the bearing 110 can include an inner race that is secured to or positioned on the shaft 30 in any suitable manner.

Adjacent to the journal portion 102 of the illustrated shaft 30, the disk portion 100 extends outward from the main body of the shaft 30. The illustrated disk portion 100 is integrally formed with the shaft 30 in the illustrated arrangement. In the illustrated arrangement, the shaft 30 can be made from a simple forging. In other configurations, the disk portion 100 can be separately formed and secured to the shaft 30 in any suitable manner. The disk portion 100 forms one side of the cone shaped opening in which the chain 16 is positioned.

The cylinder wall 94 described above forms a portion of a moveable disk 112 that translates along a portion of the input shaft 30. The cylinder wall 94 preferably is integrally formed with the main portion of the moveable disk. As such, the moveable disk 112 preferably is formed as a near net size forging. In other arrangements, the cylinder wall 94 can be formed separately and secured to the moveable disk 112 in any suitable manner. The illustrated arrangement, however, advantageously reduces manufacturing and assembly costs.

In the illustrated embodiment, the main portion of the moveable disk 112 is interposed between the disk portion 100 of the input shaft 30 and the bulkhead 80. The moveable disk 112 advantageously comprises a slight step 114 where the cylinder wall 94 joins the main body of the disk. The step 114 allows the cylinder wall 94 to have an enlarged diameter while the main body of the disk is less likely to interfere with rotation of the first transfer pulley assembly 20.

The cylinder wall 94 also comprises a spline region 116. The spline region 116 engages the spline region 86 formed on the skirt 84 of the bulkhead 80. Because the cylinder wall 94 moves axially relative to the bulkhead 80, the spline region 116 of the cylinder wall can be substantially shorter in length than the spline region 86 of the skirt 84 of the bulkhead 80. In some arrangements, the spline region 86 of the skirt 84 can be shorter in length than the spline region 116 of the cylinder wall 94.

A cylinder chamber 118 is defined within a region generally bounded by the bulkhead 80, the cylinder wall 94 and the disk portion of the moveable disk 112. This cylinder chamber 118 comprises a pressure chamber into which fluid can be introduced and from which fluid can be evacuated to cause movement of the moveable disk 112 relative to the bulkhead 80. As discussed above, the sliding connection between the skirt 84 and the cylinder wall 94 is sealed by an o-ring or any other suitable sealing component.

Figure 7:
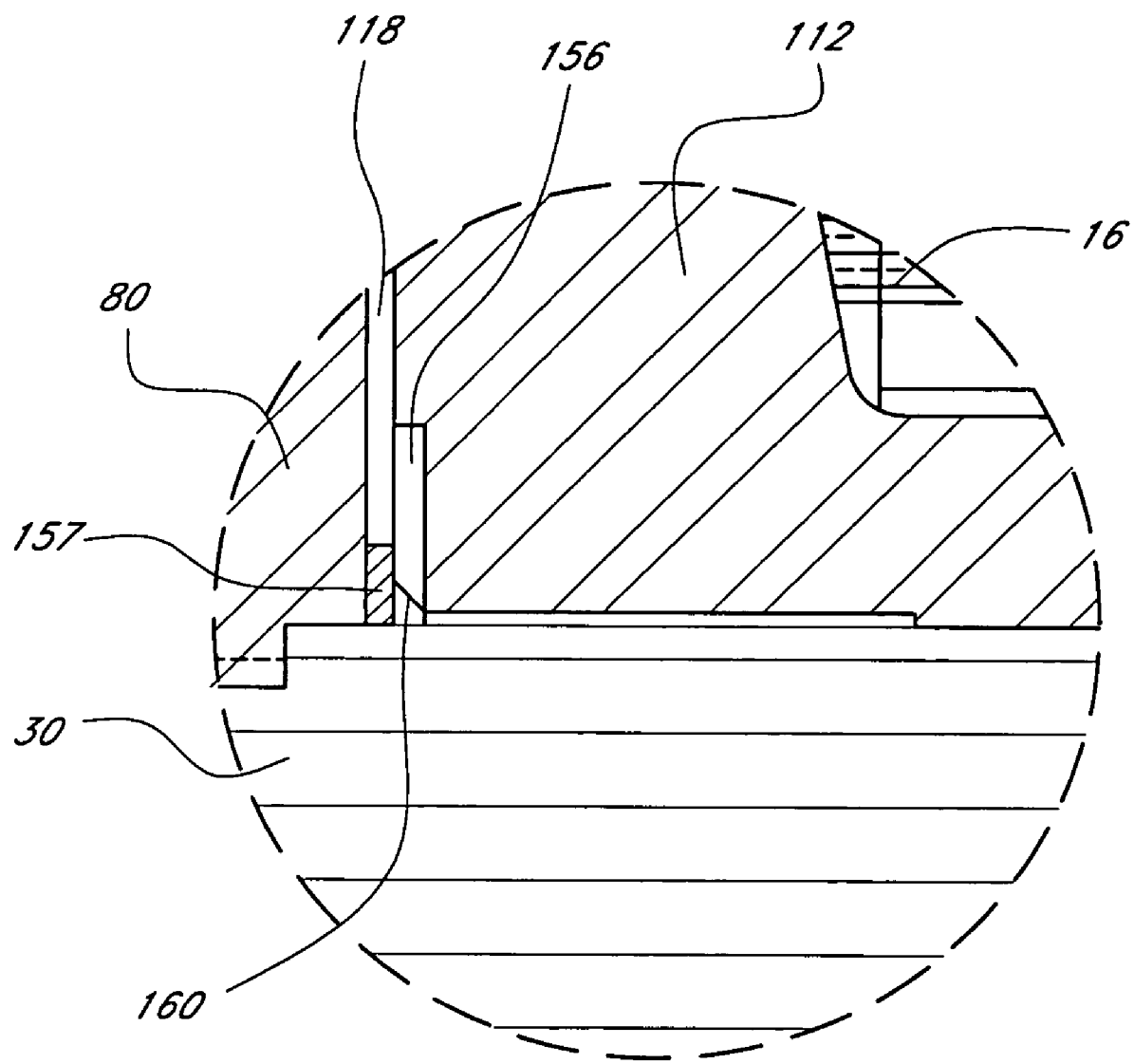
FIG. 7 is an enlarged view of a portion of FIG. 1 indicated by the circle labeled 7.

The inside diameter of the cylinder wall 94 forms a close tolerance large bearing surface with the bearing region 90 of the bulkhead skirt 84. In addition, a bore defined through an axial center of the moveable disk 112 is sized to form another close tolerance bearing surface relative to the input shaft 30. With reference to FIG. 7, the bore comprises a very slight step such that the portion of the bore positioned closest to the disk portion 100 of the input shaft 30 forms the bearing surface while the portion disposed closer to the bulkhead 80 has a slightly larger diameter. Thus, the interface between the input shaft 30 and the smaller diameter portion of the bore through the moveable disk 112 forms a first bearing and the interface between the inner surface of the cylinder wall and the outer surface of the skirt 84 of the bulkhead 80 forms a second bearing.

The two bearings are spaced with the larger diameter portion being positioned away from the chain 16. Together, the two bearings define an ample length to diameter ratio such that the face of the moveable disk 112 that bears against the chain 16 can remain substantially square and concentric without substantial binding or overloading during movement. In most embodiments, this arrangement facilitates movement of the moveable disk 112 even though the disk 112 is subjected to large asymmetric loads by the interface with the chain 16.

Hydraulic pressure changes within the chamber 118 during ratio changes causes the disk 112 to move relative to the bulkhead 80. The movement causes relative movement at the spline regions 86, 116. Because the large diameter bearing is positioned generally adjacent the spline regions 86, 116 in the illustrated arrangement, a tendency for the moveable disk 112 to wobble relative to the axis 46 during combined axial movement and rotational movement is greatly reduced or eliminated. Thus, the large diameter bearing surface forms a dominant alignment feature in the illustrated arrangement.

As described above, the second end 42 of the shaft 30 defines the inner race of the bearing 110 that supports that end of the shaft. Preferably, the bearing 110 is positioned within the bearing holder 36. FIGS. 2 and 3 illustrate one configuration of the bearing holder 36. The bearing holder 36 preferably is designed to be secured generally centrally within the housing 34. In the illustrated arrangement, threaded fasteners 120 secure the bearing holder 36 in position relative to the housing 34. In particular, the housing comprises a first portion 122 and a second portion 124 with the bearing holder 36 interposed between the first portion 122 and the second portion 124. The housing portions have been designed for manufacture with a single aluminum permanent mold but other manufacturing techniques, and corresponding design changes, can be used. For instance, given high enough production quantities, aluminum die casting can be used and the design can incorporate differing wall thicknesses and support ribs.

As illustrated in FIG. 2, the bearing holder 36 comprises internally threaded apertures 126 positioned about its peripheral surface. As illustrated in FIG. 3, the apertures 126 preferably are arranged in pairs with one of each pair of apertures 126 being used to secure the bearing holder 36 to the respective portion 122, 124 of the housing 36. The bearing holder 36 also can be formed by die casting aluminum.

With reference to FIGS. 1 and 3, the bearing holder 36 comprises a pair of generally annular grooves 130. The grooves 130 preferably define a bearing mounting location. In the illustrated arrangement, an outer race 132 of each bearing 110 can be pressed into place within the respective groove 130. As such, the bearing holder 36 is positioned between the second ends of the input shaft 30 and the output shaft 32 in the illustrated arrangement. Thus, the bearing holder 36 advantageously can support both the input shaft 30 and the output shaft 32. The bearings 110 advantageously can contain what can be termed a full complement of rollers for maximum radial load carrying capability. The bearings 110 also preferably require no cage. Instead, the rollers can be held in place during assembly with high-viscosity grease. Moreover, as discussed above, the shafts 30, 32 define the inner race for the bearings 110 and no separate inner race is required. In some embodiments, other types and constructions of bearings, with or without inner races, can be used.

With reference now to FIGS. 1-3, the bearing holder 36 also comprises a pair of entry passages 134 for a fluid source. Preferably, the passages 134 are entry passages for a high pressure fluid system that is used to feed oil, lubricant or other suitable fluids to the chambers 118 and that is used to supply oil, lubricant or other suitable fluids for lubrication of many of the moving components of the transmission 10. The passages 134 preferably comprise an enlarged opening that can comprise internal threads such that tubing (not shown) can be connected to the passages 134 with suitable fittings. The tubing can be used to deliver the high pressure fluid from any suitable source.

The passages 134 extend to axial passages 136 that extend toward the shafts 30, 32. The axial passages 136 preferably also comprise an enlarged opening that can comprise internal threads. The enlarged opening can accommodate a threaded compression fitting 140. Other suitable configurations also can be used.

With reference to FIG. 1, a tube 142 can be secured to the bearing holder 36 by the compression fitting 140. The tube 142 advantageously defines a backbone of a supply gallery 144. The tube 142 preferably is axially positioned in the respective shaft 30, 32. Thus, the tube 142 preferably is positioned along the axial centerline of the respective shaft 30, 32.

It is noted that during assembly of the transmission 10, the tubes 142 preferably are secured to the bearing holder 36 prior to being inserted into the shafts. The compression fittings 140 are used to grasp the outside diameters of the tubes 142 and secure them to the bearing holder 36. This mounting arrangement results in the tubes 142 being restrained against any substantial axial or rotational movement relative to the bearing holder. Any other suitable technique can be used to secure the tubes 142 against rotation and axial movement. For instance, a pin can be used to secure the tubes 142 in position in the bearing holder 36. Such an arrangement is shown and described in copending U.S. patent application Ser. No. 11/033,206, filed on the same date as this application, entitled SINGLE CHAIN CONTINUOUSLY VARIABLE TRANSMISSION, which is hereby incorporated by reference in its entirety.

Any desired centering adjustments to the tubes can be made once they have been secured to the bearing holder 36 by bending the tubes and a fixture can be designed to verify that the tubes 142 have been inserted generally coaxially within the shafts. Such a fixture will be described below. In any event, as illustrated, the tubes 142 are somewhat cantilevered between the shaft bore ends 42 and the bearing holder 36 such that some flexing of the tubes 142 is permitted to accommodate small misalignments.

During operation of the transmission 10, the tubes 142 may drag against portions of the bore in which they are inserted and the tubes 142 therefore are expected to wear to some degree over time. Thus, the clearance between the tubes 142 and the bore in which they are inserted is expected to be on the order of between about 0.001 and 0.002 inches in the illustrated arrangement. Given the relatively close tolerance, the interaction between the tube 142 and the bore create a structure that can function similar to a labyrinth seal that allows a low leakage rate without the need for sealing rings or other sealing structures. Such structures as a labyrinth seal can be used and/or the tolerances can be altered if desired to manipulate the leakage rate.

A distal end 146 of the tube 142 carries a plug 150. The plug closes off the distal end of the tube 142 and the tube 142 is not secured to the respective shaft 30, 32. Thus, the tube carries the thrust loading created by the high pressure fluid supply system. As such, no, or very minimal, thrust load is transferred to the shafts from the high pressure fluid supply system in the illustrated arrangement.

Fluid is transmitted from the tube 142 to the chamber 118 via cross holes 152 that are positioned within a region of the respective shaft 30, 32 that contains a radial fluid passage 154. The fluid pressure variations that are fed into the chambers 118 via the tubes 142 are used to maintain chain clamping forces and to actuate the moveable disks 112. The radial fluid passage 154 preferably extends between the bore that contains the tube 142 and an outer diameter of the respective shaft 30, 32. The radial fluid passage 154 is axially positioned in a location that generally corresponds to the chamber 118. In the illustrated arrangement, the dimension of the passage 154 in the axial direction of the shaft 30, 32, which preferably is the diameter of the passage 154, is generally defined by the stroke limits of the moveable disk 112. In the illustrated arrangement, a slot 156 provides a fluid connection between the chamber 118 and the passage 154 when the moveable pulley assembly 112 is in its position closest to the bulkhead 80 because illustrated moveable disk 112 otherwise closes off the passage. In the illustrated arrangement, as best shown in FIG. 7, a stop 157 can be positioned between the bulkhead 80 and the moveable disk 112. The stop 157 can be configured as a washer or a similar annular member and preferably spaces the moveable disk 112 from the bulkhead 80 to maintain the cylinder chamber 118 with at least a minimum volume. The slot 156 preferably intersects a chamfered edge 160 of the disk 112 such that the fluid communication can be maintained regardless of the angular orientation of the shaft 30, 32.

With continued reference to FIG. 1, a small amount of fluid leakage travels down the bore along the tube 142 to lubricate the interface between the bore and the tube 142. Of this small amount of leakage, some portion exits the shaft 30, 32 via a small radial passage 162. The fluid passing through the passage 162 lubricates the bearing 66. Another portion of the leakage flows in the opposite direction to lubricate the bearing holder 36 and the associated roller bearings.

The housing 34 supports the illustrated countershaft 26 at each end. As shown in FIG. 1, the countershaft supports both of the first and second transfer pulleys 20, 24. Each of these pulleys 20, 24 comprises a fixed disk 170. The fixed disks 170 form half of the pulleys 20, 24. The other half of the pulleys 20, 24 is defined by a shuttle disk 172. The shuttle disk 172 is adapted to move axially along the countershaft 26 between the two fixed disks 170.

As shown in FIG. 1, the countershaft 26 has a first end 174 and a second end 176. Each end contains a large bore 180 and the two large bores 180 are connected by a gallery bore 182.

The countershaft 26 also comprises an exterior threaded region 184 at each end 174, 176. A locknut 186 engages the threaded region. Each locknut 186 axially secures the respective fixed disk 170 in position on the countershaft 26. Moreover, a plurality of spring pins 190 or other suitable components secure the fixed disk 170 in rotational position on the countershaft 26 such that the connections between the fixed disks 170 and the countershaft 26 form substantially zero backlash connections. In the illustrated arrangement, the pins 190 extend into a shoulder formed on the countershaft 26. Other suitable arrangements can be used to mount the fixed disks 170 to the countershaft 26.

The fixed disks 170 can be formed by forging or any other suitable technique. The fixed disks 170 preferably comprise a journal portion 192 and a disk portion 194. The journal portion 192 defines an inner race for a bearing 196. The bearing 196 can be secured in a recess formed in the outer housing 34. Other arrangements, including using a bearing with an inner race that is mounted on the fixed disk 170, also can be used. The disk portion 194 can comprise an outer contour that enables compact packaging of the transmission 10. For instance, the outer contour of each disk portion 194 can have a recessed portion that accommodates a portion of the moveable disk 112 of the input and output shafts 30, 32 respectively.

The illustrated shuttle disk 172 comprises a pair of disk portions 200 and can be manufactured by forging or any other suitable technique. The disk portions 200 are connected by a sleeve portion 202. In some configurations, a key 204 or other suitable construction can be used to rotationally secure the shuttle disk 172 to the countershaft 26. In other configurations, the shuttle disk 172 is not rotationally secured to the countershaft 26. The shuttle disk 172 advantageously is capable of sliding movement along an axial direction of the countershaft 26. As the shuttle disk 172 moves between the fixed disks 170, the effective diameter of the transfer pulleys 20, 24 vary. Preferably, the shuttle disk 172 floats on the countershaft 26 as a bearing. More preferably, a slightly larger diameter bore is positioned between two smaller diameter bores such that the smaller diameter bores define bearing surfaces relative to the countershaft 26 and the slightly larger diameter bore defines a cavity and reduces the surface contact between the shuttle disk 172 and the countershaft 26.

Similar to the fluid supply system described above, a tube 210 extends into the gallery bore 184. In the illustrated arrangement, a pair of tubes 210 is provided and the tubes extend only partway into the gallery bore 184. The outer ends of the tubes 210 are secured with threaded compression fittings 211 into supply ports 213. Between the inner ends of the tubes 210, three radial passages 212, 214, 216 are provided. The radial passages 212, 214, 216 extend from the gallery bore 184 to the outer diameter of the countershaft 26. Two of the passages 212, 214 define chain lubrication and cooling ports while the third passage 216 supplies fluid to the interface between the shuttle disk 172 and the countershaft 26. Other fluid supply arrangements can be used but the illustrated arrangement is advantageously simple and generally provides an axially balanced thrust loading.

During operation, a portion of the fluid supplied to the countershaft 26 passes out of the gallery bore 182 in the space defined between the tubes 210 and the bore 182. The portion that passes from the gallery bore 182 in this manner leaks to supply fluid to the bearings 196 and/or passes to the inside surfaces of the housing. Moreover, fluid from the assemblies relating to the input and output shafts 30, 32 leaks downward within the housing. This leakage collects within a groove 220 formed in each portion 122, 124 of the housing and drops through a passage 222 formed in each portion 122, 124 of the housing. This leakage then lubricates the bearings 196 of the countershaft 26. As illustrated, a lower portion of the housing contains a baffle plate 224 that defines, in part, a collection chamber 226, reservoir or the like. Pick-up passages 230 extend into the collection chamber 226. The pick-up passages 230 can be used to draw used fluid from within the transmission 10 to a reservoir (not shown) or the like such that the fluid can be filtered and returned to the transmission through the appropriate pressure feed conduits.

Figure 4:
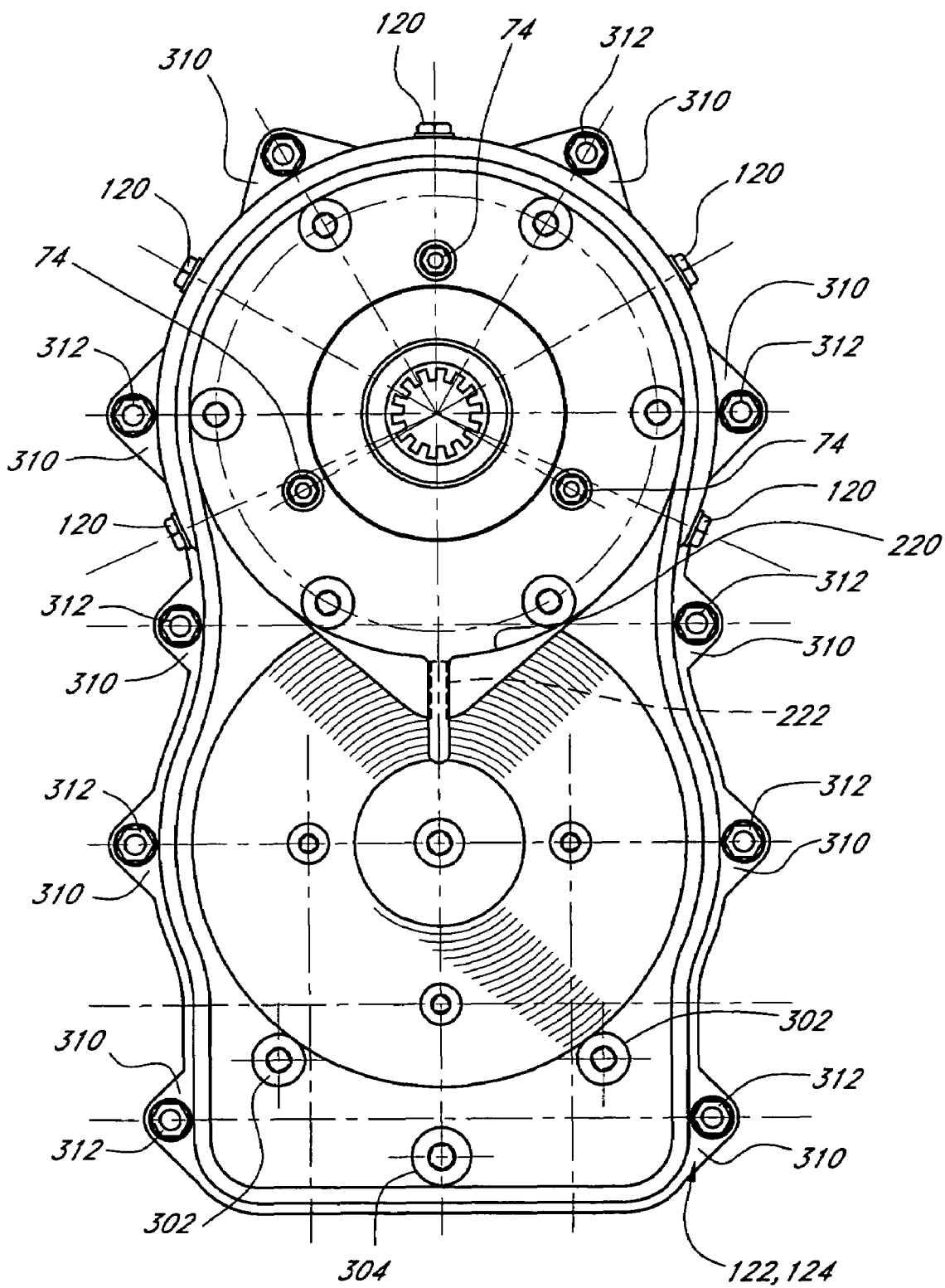
FIG. 4 is an outside view of an assembled transmission housing used to enclose the mechanical components of the transmission of FIG. 1.
Figure 5:
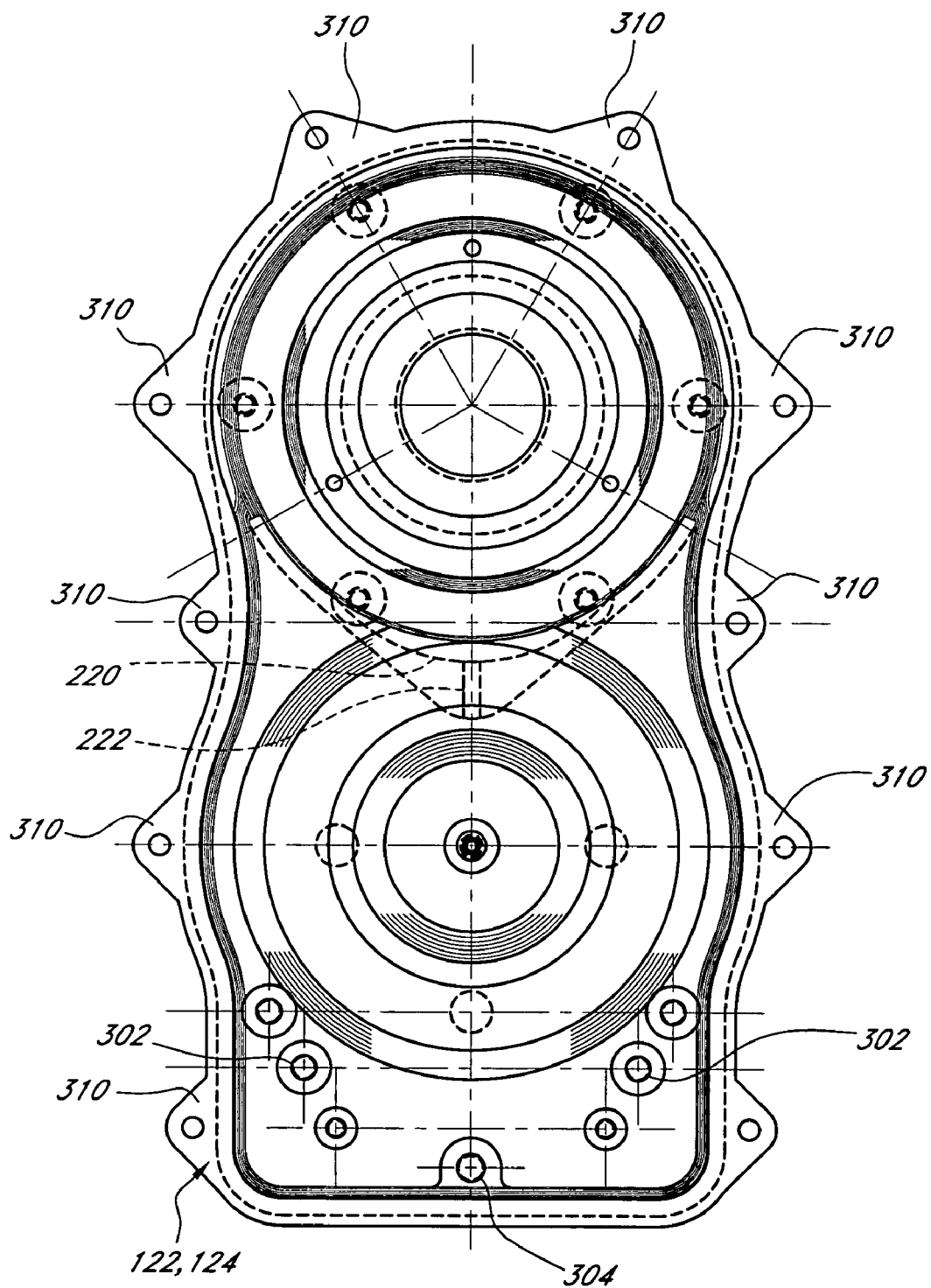
FIG. 5 is an inside view of the housing member of FIG. 4.

With reference to FIGS. 1, 4 and 5, the housing portions 122, 124 preferably are substantially identical to each other. In the illustrated arrangement, the difference between the two housings consists in a groove 300 that accommodates an o-ring or suitable sealing member. The groove 300 can be manufactured in one side after identical castings are used to manufacture both portions 122, 124. Moreover, the housing portions 122, 124 provide multiple possible port locations and such locations can be used in only one or in both portions 122, 124. In the illustrated construction, two of the port locations in one portion are used for high pressure supply ports 302. These ports 302 are connected with hoses to the ports that are connected to the passages 134 formed in the bearing holder 36. A pick-up port 304 also extends through at least one of the housing portions 122, 124. Moreover, a series of bosses 310 allow the use of threaded fasteners 312 to secure the two housing portions 122, 124 together to enclose the working mechanisms of the transmission 10.

Figure 6:
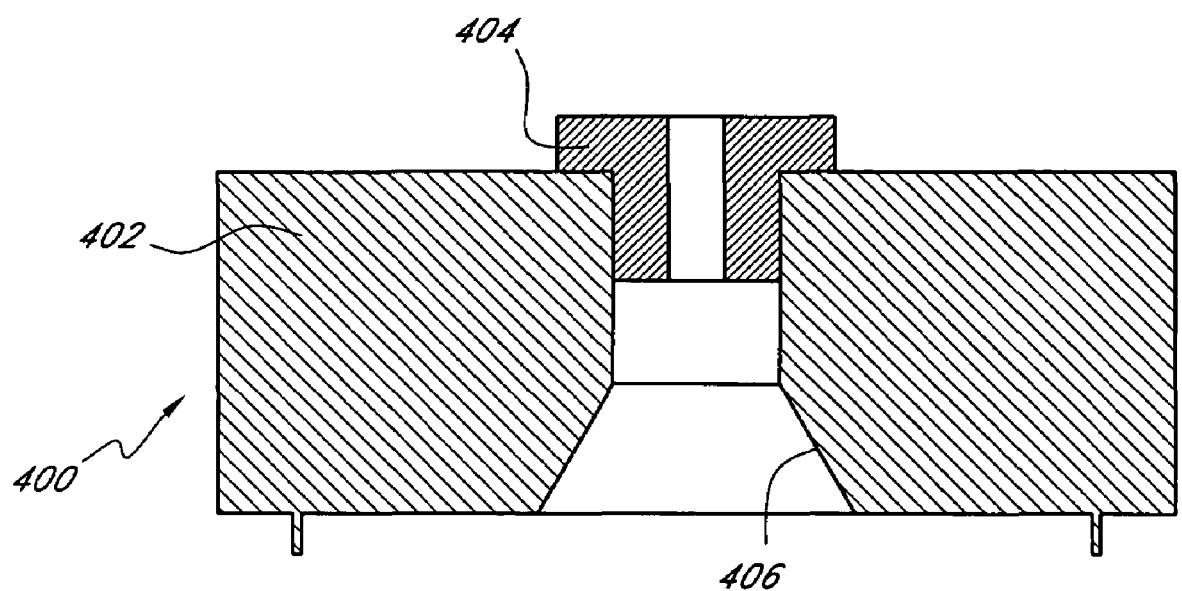
FIG. 6 is a sectioned view of a tube alignment fixture that can be used to mount high pressure fluid tubes in shafts for use in the transmission of FIG. 1.

As discussed above, tubing is inserted into bores formed in the input shaft 30, the countershaft 26 and the output shaft 32. The tubes have a close fit within the bores and thus an alignment fixture 400 has been designed to help properly position the tubes within the bores to reduce the likelihood of extreme wear caused by contact between the bore and the tube. With reference now to FIG. 6, a fixture 400 is shown therein. The fixture 400 comprises a short collar 402 and a bushing 404. The collar 402 has a through hole 406. In the illustrated arrangement, the hole 406 has a conical portion and a cylindrical portion. The bushing 404 is sized for a close sliding fit within at least the cylindrical portion of the hole 406.

The collar 402 is inserted along the inside diameter of the bearing outer race, which will have been embedded into the bearing holder 36. By insertion of the collar 402, the fixture will be generally concentric to the bearing holder axis and the fixture will be generally square relative to the bearing holder's face. The tube 142 will then protrude through the hole 406. The bushing 404 is then threaded over the tube 142 and slid toward the collar 402. If the bushing 404 slides into the hole 406, then the tube 142 is properly aligned. If the bushing 404 does not slide into the hole 406, then the tube 142 is not properly aligned and the tubing can be bent to achieve a proper alignment.

Although the present invention has been described in terms of a certain embodiment, other embodiments apparent to those of ordinary skill in the art also are within the scope of this invention. Thus, various changes and modifications may be made without departing from the spirit and scope of the invention. For instance, various components may be repositioned as desired. Moreover, not all of the features, aspects and advantages are necessarily required to practice the present invention. Accordingly, the scope of the present invention is intended to be defined only by the claims that follow.

What is claimed is:

1. A continuously variable transmission comprising:

a housing that defines a belt chamber, said housing comprising a first portion and a second portion, said first portion and said second portion being substantially identical;

an input pulley assembly and an output pulley assembly positioned within said belt chamber, a first transfer pulley assembly and a second transfer pulley assembly mounted to a countershaft, a first chain extending between said input pulley assembly and said first transfer pulley assembly, a second chain extending between said second transfer pulley assembly and said output pulley assembly, said input pulley assembly comprising a first end and a second end, said first end being supported by said housing and said second end being supported by a bearing holder, said bearing holder being captured between said first portion and said second portion of said housing, said bearing holder comprising a fluid port, said fluid port being fluidly connected to a fluid passage that extends through at least a portion of said bearing holder;

said output pulley assembly comprising a first end and a second end, said first end being support by said housing and said second end being supported by said bearing holder;

said countershaft comprising a first end and a second end, said first end being supported by said housing and said second end being supported by said housing;

said input pulley assembly comprising a shaft portion and a fixed disk portion, said shaft portion and said disk portion being integrally formed, said input pulley assembly also comprising a bulkhead that is axially fixed along said shaft portion and a moveable disk that is positioned between said bulkhead and said fixed disk portion, said bulkhead being secured to said shaft portion for rotation with said shaft portion and said moveable disk portion being coupled to said bulkhead for rotation while remaining axially movable along said shaft portion relative to said bulkhead;

said output pulley assembly comprising a shaft portion and a fixed disk portion, said shaft portion and said disk portion being integrally formed, said output pulley assembly also comprising a bulkhead that is axially fixed along said shaft portion and a moveable disk that is positioned between said bulkhead and said fixed disk portion, said bulkhead being secured to said shaft portion for rotation with said shaft portion and said moveable disk portion being coupled to said bulkhead for rotation while remaining axially movable along said shaft portion relative to said bulkhead;

said first transfer pulley assembly comprising a fixed disk portion and a moveable disk portion, said fixed disk portion being axially and rotationally secured to said countershaft;

said second transfer pulley assembly comprising a fixed disk portion and a moveable disk portion, said fixed disk portion being axially and rotationally secured to said countershaft;

said moveable disk portion of said first transfer pulley assembly and said moveable disk portion of said second transfer pulley assembly being defined in a single shuttle disk member, said shuttle disk member being positioned along said countershaft between said fixed disk portion of said first transfer pulley assembly and said fixed disk portion of said second transfer pulley assembly, said shuttle disk member being adapted for axial translation along said countershaft, said shuttle disk member comprising a first bearing portion and a second bearing portion that are separated by a recessed portion, and said first and second bearing portion abutting said countershaft.

2. The transmission of claim 1, wherein said fixed disk portion of said first transfer pulley assembly comprising a journal portion and said journal portion forms an inner race of a bearing.

3. The transmission of claim 1, wherein said second end of said input pulley assembly comprising a journal portion and said journal portion forms an inner race of a bearing that is mounted in said bearing holder.

4. The transmission of claim 3, wherein said first end of said input pulley assembly comprises an internally splined bore.

5. The transmission of claim 1 further comprising a fluid tube, said fluid tube being fluidly connected to said fluid passage and said fluid tube being positioned within an axial bore formed in said shaft portion of said input pulley assembly.

6. The transmission of claim 5, wherein said fluid tube extends only partway through said axial bore and an end of said fluid tube that is positioned within said axial bore is closed by a plug.

7. The transmission of claim 6 further comprising a radial fluid passage extending through said shaft portion of said input pulley assembly at a location generally positioned between said moveable disk and said bulkhead.

8. The transmission of claim 7, wherein said fluid tube comprises at least one hole that corresponds to the location of the radial fluid passage.

9. A continuously variable transmission comprising:

a housing that defines a belt chamber;

an input pulley assembly and an output pulley assembly positioned within said belt chamber, a first transfer pulley assembly and a second transfer pulley assembly mounted to a countershaft, a first chain extending between said input pulley assembly and said first transfer pulley assembly, a second chain extending between said second transfer pulley assembly and said output pulley assembly, said input pulley assembly comprising a first end and a second end, said first end being supported by said housing and said second end being supported by a bearing holder, said bearing holder comprising a fluid port, said fluid port being fluidly connected to a fluid passage that extends through at least a portion of said bearing holder;

said output pulley assembly comprising a first end and a second end, said first end being support by said housing and said second end being supported by said bearing holder;

said countershaft comprising a first end and a second end, said first end being supported by said housing and said second end being supported by said housing;

said input pulley assembly comprising a shaft portion and a fixed disk portion, said shaft portion and said disk portion being integrally formed, said input pulley assembly also comprising a bulkhead that is axially fixed along said shaft portion and a moveable disk that is positioned between said bulkhead and said fixed disk portion, said bulkhead being secured to said shaft portion for rotation with said shaft portion and said moveable disk portion being coupled to said bulkhead for rotation while remaining axially movable along said shaft portion relative to said bulkhead;

said output pulley assembly comprising a shaft portion and a fixed disk portion, said shaft portion and said disk portion being integrally formed, said output pulley assembly also comprising a bulkhead that is axially fixed along said shaft portion and a moveable disk that is positioned between said bulkhead and said fixed disk portion, said bulkhead being secured to said shaft portion for rotation with said shaft portion and said moveable disk portion being coupled to said bulkhead for rotation while remaining axially movable along said shaft portion relative to said bulkhead;

said first transfer pulley assembly comprising a fixed disk portion and a moveable disk portion, said fixed disk portion being axially and rotationally secured to said countershaft;

said second transfer pulley assembly comprising a fixed disk portion and a moveable disk portion, said fixed disk portion being axially and rotationally secured to said countershaft;

said moveable disk portion of said first transfer pulley assembly and said moveable disk portion of said second transfer pulley assembly being defined in a single shuttle disk member, said shuffle disk member being positioned along said countershaft between said fixed disk portion of said first transfer pulley assembly and said fixed disk portion of said second transfer pulley assembly, said shuffle disk member being adapted for axial translation along said countershaft, said shuttle disk member comprising a first bearing portion and a second bearing portion that are separated by a recessed portion, and said first and second bearing portion abutting said countershaft.

10. The transmission of claim 9 further comprising a fluid tube, said fluid tube being fluidly connected to said fluid passage and said fluid tube being positioned within an axial bore formed in said shaft portion of said input pulley assembly.

11. The transmission of claim 10, wherein said fluid tube extends only partway through said axial bore and an end of said fluid tube that is positioned within said axial bore is closed by a plug.

12. The transmission of claim 11 further comprising a radial fluid passage extending through said shaft portion of said input pulley assembly at a location generally positioned between said moveable disk and said bulkhead.

13. The transmission of claim 12, wherein said fluid tube comprises at least one hole that corresponds to the location of the radial fluid passage.

* * * * *

UNITED STATES PATENT AND TRADEMARK OFFICE
CERTIFICATE OF CORRECTION

PATENT NO. : 7,540,815 B2
APPLICATION NO. : 11/032924
DATED : June 2, 2009
INVENTOR(S) : Albert W. Brown It is certified that error appears in the above-identified patent and that said Letters Patent is hereby corrected as shown below:

At column 2, line 38, please delete "shuttle disc" and add --shuttle disk--.

At column 10, line 36, in Claim 1, please delete "support" and add --supported--.

At column 11, line 62, please delete "support" and add --supported--.

At column 12, line 37, in Claim 1, please delete "shuffle" and add --shuttle--.

At column 12, line 41, in Claim 1, please delete "shuffle" and add --shuttle--.

Signed and Sealed this

Seventeenth Day of November, 2009

David J. Kappos
*Director of the United States Patent and Trademark Office*